(12) United States Patent
Baumgartner et al.

(10) Patent No.: US 7,048,095 B1
(45) Date of Patent: May 23, 2006

(54) HYDRAULICALLY ACTUATED PARKING BRAKE

(75) Inventors: Ernest S. Baumgartner, Dayton, OH (US); Bryan P. Riddiford, Dayton, OH (US); Schuyler S. Shaw, Dayton, OH (US); John B. Hageman, Vandalia, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/000,465

(22) Filed: Nov. 30, 2004

(51) Int. Cl.
*F16D 55/26* (2006.01)

(52) U.S. Cl. .................. 188/72.6; 188/156; 188/265
(58) Field of Classification Search ............... 188/72.6, 188/156 X, 163, 265 X; 303/9, 15, 20
See application file for complete search history.

(56) References Cited

U.S. PATENT DOCUMENTS

| | | | |
|---|---|---|---|
| 5,954,162 A * | 9/1999 | Feigel et al. ............... | 188/72.6 |
| 6,311,808 B1 * | 11/2001 | Halasy-Wimmer et al. ......................... | 188/72.6 |
| 6,550,870 B1 * | 4/2003 | Goodzey ....................... | 303/9 |
| 6,913,121 B1 * | 7/2005 | Park ........................... | 188/156 |

* cited by examiner

*Primary Examiner*—Melanie Torres
(74) *Attorney, Agent, or Firm*—Michael D. Smith

(57) ABSTRACT

A parking brake system including at least one braking unit actuated by at least one cable, a cylinder having a piston chamber and a rod chamber, a piston slidably received within the cylinder and having a rod connected thereto, the rod extending through the rod chamber and operably connected to the cable, a pressurized fluid source connected to the piston chamber, and a valve for controlling the flow of the fluid to the piston chamber, wherein the piston and rod move through the cylinder when the fluid pressurizes the piston chamber, thereby actuating the braking unit.

18 Claims, 1 Drawing Sheet

HYDRAULICALLY ACTUATED PARKING BRAKE

This invention was made in the performance of a Cooperative Research and Development Agreement with the Department of the Air Force (Contract No. F33615-01-2-5804/CRADA 01-156-PR-01). Thus, the Government of the United States may have certain rights to the invention.

BACKGROUND

The present invention is directed to a parking brake and, more particularly, to a hydraulically actuated parking brake.

Parking brakes are typically used on various vehicles such as passenger cars, trucks, vans, utility vehicles, buses, freight vehicles, military vehicles, trolleys, locomotives and the like for securing the vehicle in a fixed location when the vehicle is not in use. A typical parking brake is a redundant means for securing the vehicle in a fixed location and therefore may be used in combination with a primary means for securing the vehicle in a fixed location (e.g., placing the vehicle in gear).

Parking brakes typically include a braking unit mounted in the rear wheel brakes of the vehicle. A pedal or lever located in the passenger compartment of the vehicle is mechanically connected to the braking units by cables. When the pedal or lever is actuated, the cables exert a sufficient force on the braking units, thereby applying the rear wheel brakes and locking the vehicle in place.

The mechanical connection between the pedal (or lever) in the passenger compartment and the braking units at the rear of the vehicle has several disadvantages. For example, the cable routings extending from the passenger compartment to the rear wheel brakes are expensive, occupy a significant amount of space and are cumbersome and difficult to install. Furthermore, the pedal (or lever) is typically positioned in an inconvenient location within the passenger compartment and requires a significant amount of components and labor to install.

Accordingly, there is a need for a parking brake that may be hydraulically actuated and released with the push of a button.

SUMMARY

One embodiment of the present invention is a parking brake system including at least one braking unit actuated by at least one cable, a cylinder having a piston chamber and a rod chamber, a piston slidably received within the cylinder and having a rod connected thereto, the rod extending through the rod chamber and operably connected to the cable, a pressurized fluid source connected to the piston chamber, and a valve for controlling the flow of the fluid to the piston chamber, wherein the piston and rod move through the cylinder when the fluid pressurizes the piston chamber, thereby actuating the braking unit.

A second embodiment of the present invention provides a parking brake system including at least one braking unit actuated by at least one cable, a cylinder having a piston chamber and a rod chamber, a piston slidably received within the cylinder and having a rod connected thereto, the rod extending through the rod chamber and operably connected to the cable, a mandrel rotatably connected to the rod, a locking device operably associated with the mandrel, the locking device permitting rotation of the mandrel in a first direction and preventing rotation of the mandrel in a second direction, and a pressurized fluid source for selectively pressurizing the piston chamber such that the piston and rod extent through the cylinder and exert a force on the cable, thereby actuating the braking unit, wherein the locking device locks the piston and rod in the extended position.

A third embodiment of the present invention provides a method for hydraulically actuating a parking brake including the steps of providing at least one braking unit having at least one actuating cable attached thereto, connecting the cable to a rod attached to a piston, the piston being slidably received within a cylinder having a piston chamber and a rod chamber, and supplying a pressurized fluid to the piston chamber, thereby extending the piston and rod out of the chamber such that the rod exerts a force on the cables, the force being sufficient to actuate the braking unit.

Other embodiments, objects and advantages of the present invention will be apparent from the following description, the accompanying drawings and the appended claims.

DETAILED DESCRIPTION

Figure 1:
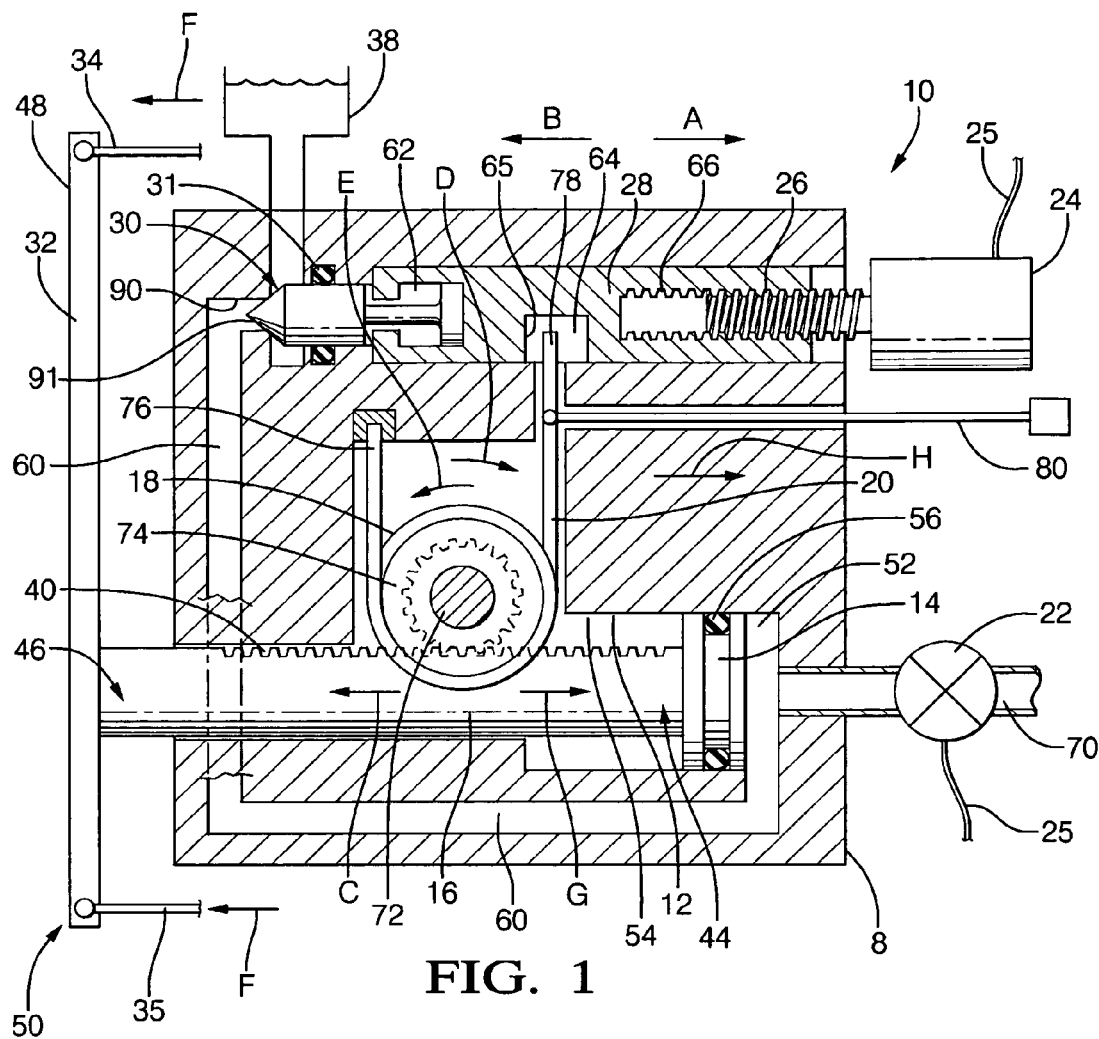
FIG. 1 is a somewhat schematic front elevational view of a parking brake system of the present invention.

As shown in FIG. 1, the parking brake system of the present invention, generally designated 10, includes a housing 8, a cylinder 12, a piston 14, a rod 16, a mandrel 18, a wrap spring 20, a normally open solenoid valve 22, a motor 24, a power screw 26, a shaft 28, a valve 30, a crossbar 32, cables 34, 35 and a pressurized hydraulic fluid source 38.

The rod 16 includes a first end 44 and a second end 46 and may be generally rectangular in cross section. The rod 16 may include a rack 40 extending along an upper surface 42 of the rod 16. The first end 44 of the rod 16 is connected to the piston 14 and the second end 46 is connected to the crossbar 32.

The crossbar 32 extends substantially perpendicular to the rod 16 and includes a first end 48 and a second end 50. The first cable 34 is connected to the first end 48 of crossbar 32 and the second cable 35 is connected to the second end 50 of crossbar 32. Each cable 34, 35 is also connected, at an opposite end, to a braking unit or device (not shown). The braking unit is actuated when a sufficient force, indicated by arrows F, is applied to the cables 34, 35 by crossbar 32.

The piston 14 is slidably received within the cylinder 12, which is formed in the housing 8, and forms a piston chamber 52 and a rod chamber 54 within the cylinder 12. A gasket or seal 56 ensures a snug fit between the cylinder 12 and the piston 14.

The piston chamber 52 is in fluid communication with the fluid source 38 via fluid supply line 60 and valve 30 (that includes gaskets 31) and fluid exit line 70 via solenoid 22. Fluid lines 60, 70 are defined within the housing 8. The fluid source 38 may be any source or pressurized fluid (e.g., hydraulic oil). For example, the fluid source 38 may be a connection to the vehicle's anti-lock braking system or traction control system, thereby eliminating the need for additional pumps and/or compressors.

The valve 30, having a valve stem 90 and a valve seat 91, is controlled by shaft 28, motor 24 and power screw 26. The shaft 28 includes a valve relief 62, a release relief 64 and a threaded recess 66. The threaded recess 66 receives the power screw 26 such that, when the motor 24 rotates the power screw 26 in a first direction, the shaft 28 moves in the direction shown by arrow A. Alternatively, when the motor 24 rotates the power screw 26 in the opposite direction, the shaft 28 moves in the direction shown by arrow B. Accordingly, the valve 30 may be opened and closed by operation of the motor 24. The valve relief 62 allows the shaft 28 to move a predetermined distance prior to opening the valve 30.

Thus, the piston chamber 52 may be pressurized by closing solenoid 22 and opening valve 30 (as discussed above) such that fluid flows from the fluid source 38, through the supply line 60, and into the piston chamber 52, thereby extending the piston 14, rod 16 and crossbar 32 in the direction indicated by arrow C to apply force F on the cables 34, 35, which is transmitted to a braking device (not shown).

Figure 2:
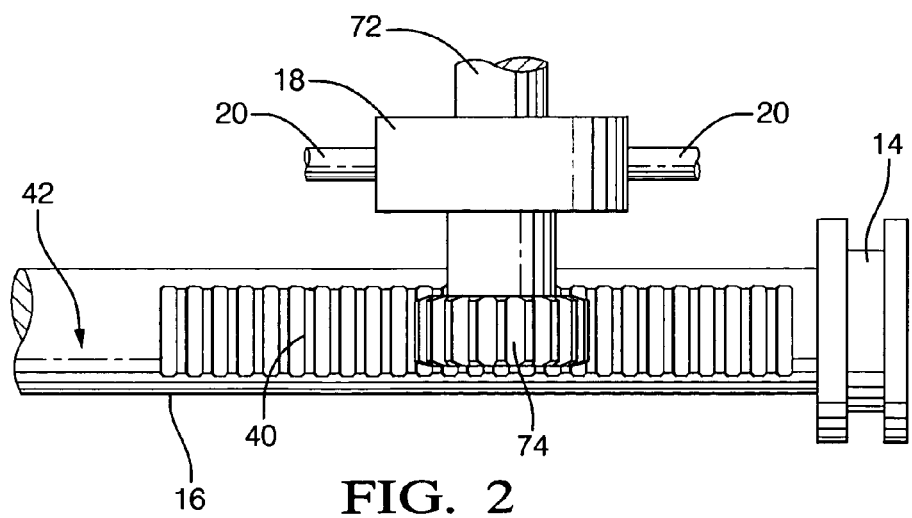
FIG. 2 is a top plan view of a detail of the parking brake system of FIG. 1 showing a mechanical locking mechanism.

The mandrel 18 and wrap spring 20 mechanically secure the piston 14 and rod 16 in the extended (i.e., actuated) position. As shown in FIG. 2, a geared cylinder 74 and a central rod 72 are attached to the mandrel 18. The central rod 72 is received in a circular recess (not shown) to allow the mandrel 18 and geared cylinder 74 to rotate about the axis of the central rod 72. The geared cylinder 74 includes a plurality of gear teeth for engaging the rack 40, thereby coupling the mandrel 18 to the rod 16.

The U-shaped wrap spring 20 is generally wound in a similar fashion as a torsion spring and includes a first end 76 and a second end 78. The first end 76 is fixed and the second end 78 is free and extends into the release relief 64. The radius of curvature of the wrap-spring 20 is slightly smaller than the radius of the mandrel 18 such that the mandrel 18 snugly fits into the wrap spring 20. The snug fit of the wrap spring 20 permits rotation of the mandrel 18 in a first direction, shown by arrow D, but not is a second direction, shown by arrow E. Thus, the wrap spring 20 permits extension of the piston 14 and rod 16 (i.e., movement in the direction of arrow C) and prevents retraction of the piston 14 and rod 16 (i.e., movement in the direction of arrow G).

The wrap spring 20 may be released by urging the second end 78 of the wrap spring 20 in the direction shown by arrow H, thereby increasing the radius of curvature of the wrap spring 20 and allowing the mandrel 18 to freely rotated in the direction of either arrow D or E. According to a first embodiment of the present invention, a release cable 80 is connected to the second end 78 of the wrap spring to provide a manual release. According to a second embodiment of the present invention, movement of the shaft 28 may release the wrap spring 20. For example, when the shaft 28 is urged in the direction shown by arrow A, surface 65 of relief 64 engages the second end 78 of the wrap spring 20 and urges the second end 78 in the direction of arrow H, thereby releasing the mandrel 18 and rod 16.

According to an alternative embodiment of the present invention, the wrap spring 20 may be replaced with a ratcheting pall or other locking device or assembly for mechanically locking the piston and rod in the extended position. The ratcheting pall or other device or assembly should allow extension of the rod in the direction shown by arrow C, while preventing retraction of the rod in the direction shown by arrow G.

Accordingly, the present invention provides a system 10 for hydraulically actuating a parking brake. The system 10 is initiated by an electrical switching device (not shown) such as a switch, a push button or the like located in the passenger compartment of the vehicle. When the switch is turned on, a signal is sent (via wire 25, radio frequency or the like) to the solenoid 22 instructing the solenoid 22 to close, and to the motor 24, instructing the motor 24 to rotate the power screw 26 such that the shaft 28 begins to move in the direction shown by arrow A. As the shaft 28 moves in the direction of arrow A, the relief 64 engages the second end 78 of the wrap spring 20 thereby releasing the wrap spring 20. As the shaft 28 continues to extend beyond the length of the valve relief 62, the valve 30 begins to open and hydraulic fluid pressure fills the piston chamber 52.

As the hydraulic fluid pressure fills the piston chamber 52, the piston 14, rod 16 and crossbar 32 begin to extend in the direction shown by arrow C. The extension applies a force F on the cables 34, 35, thereby actuating the parking brake.

Once the parking brake is fully actuated, the motor 24 rotates the power screw 26 in the opposite direction, thereby urging the shaft 28 in the direction shown by arrow B. As the shaft 28 moves in the direction of arrow B, the release relief 64 disengages the wrap spring 20, thereby mechanically locking the piston 14, rod 16 and crossbar 32 in the extended position. As the shaft 28 continues, the valve 30 is closed and hydraulic fluid is sealed in the supply line 60, thereby pressurizing the line and holding piston 14 in chamber 52 to exert force F to lock the parking brake. Solenoid valve 22 may then be opened to release the pressure from the piston chamber 52. However, due to the mechanical locking of the wrap spring 20 about the mandrel 18, the piston 14, rod 16 and crossbar 32 remain in the extended (i.e., actuated) position and continue to apply the force F to the cables 34, 35 until the wrap spring 20 is released by movement of shaft 28 in direction A (as discussed above).

Although the invention is shown and described with respect to certain embodiments, equivalents and modifications will occur to those skilled in the art upon reading and understanding the specification. The present invention includes all such equivalents and modifications and is limited only by the scope of the claims.

What is claimed is:

1. A parking brake system comprising:
   at least one cable adapted to be attached to a braking unit;
   a cylinder having a piston chamber communicating with a source of pressurized fluid;
   a piston slidably received within said cylinder and having a rod connected thereto, said rod operably connected to said cable;
   a valve for selectively controlling the flow of fluid to said piston chamber from said fluid source, thereby pressurizing said piston chamber, wherein said piston moves through said cylinder in response to fluid pressure, and said rod displaces said cable, thereby actuating said braking unit; and
   a locking mechanism operably connected to said rod, wherein said locking mechanism allows said rod to extend from said cylinder but prevents said rod from retracting into said cylinder.

2. The parking brake system of claim 1 wherein said locking mechanism includes a wrap spring, a mandrel engaging said wrap spring, a geared cylinder mounted on said mandrel, and a rack mounted on said rod and meshing with said geared cylinder.

3. The parking brake system of claim 1 further comprising a motor operably connected to said valve for opening and closing said valve.

4. The parking brake system of claim 3 wherein said motor includes a power screw and a shaft operably connected to said valve, said motor driving said power screw and said shaft engaging said power screw and being linearly displaceable by rotation of said power screw.

5. The parking brake system of claim 1 further comprising a motor having a power screw and a shaft engaging said power screw such that rotation of said power screw linearly displaces said shaft, said shaft being connected to said valve for opening and closing said valve in response to linear displacement of said shaft, said shaft having a relief portion for engaging and releasing said locking mechanism.

6. The parking brake system of claim 5 wherein said motor releases said locking mechanism.

7. The parking brake system of claim 3 wherein said motor is activated by electrical signals.

8. The parking brake system of claim 3 wherein said motor is connected to be activated by an electrical switching device.

9. The parking brake system of claim 1 wherein said valve includes a valve stem and valve seat.

10. The parking brake system of claim 1 further comprising a manual release connected to said locking mechanism.

11. A vehicle comprising the parking brake system of claim 1.

12. A parking brake system comprising:
  at least one braking unit actuated by at least one cable;
  a cylinder having a piston chamber and a rod chamber;
  a piston slidably received within said cylinder and having a rod connected thereto, said rod extending through said rod chamber and operably connected to said cable;
  a mandrel rotatably connected to said rod;
  a locking device operably associated with said mandrel, said locking device permitting rotation of said mandrel in a first direction and preventing rotation of said mandrel in a second direction; and
  a pressurized fluid source for selectively pressurizing said piston chamber such that said piston and said rod extent through said cylinder and exert a force on said cable, thereby actuating said braking unit,
  wherein said locking device locks said piston and said rod in said extended position.

13. The parking brake system of claim 12 wherein said locking device is a wrap spring.

14. The parking brake system of claim 12 further comprising a release mechanism for releasing said locking device.

15. The parking brake system of claim 12 further comprising a valve for controlling said pressurization of said piston chamber.

16. The parking brake system of claim 15 wherein a motor opens and closes said valve.

17. A method for hydraulically actuating a parking brake comprising the steps of:
  providing at least one braking unit having at least one actuating cable attached thereto;
  connecting said cable to a rod attached to a piston, said piston being slidably received within a cylinder having a piston chamber and a rod chamber;
  supplying a pressurized fluid to said piston chamber, thereby extending said piston and rod out of said chamber such that said rod exerts a force on said cables, said force being sufficient to actuate said braking unit; and
  locking said rod in said extended position with a mechanical locking mechanism, thereby preventing said rod from retracting into said cylinder.

18. The method of claim 17 wherein said supplying step is initiated by an electrical switch or button.

* * * * *